United States Patent [19]
Schröder

[11] Patent Number: 4,702,601
[45] Date of Patent: Oct. 27, 1987

[54] METHOD AND APPARATUS FOR MEASURING RATE OF ROTATION BY THE SAGNAC EFFECT

[75] Inventor: Werner Schröder, Umkirch, Fed. Rep. of Germany

[73] Assignee: LITEF GmbH, Freiburg im Breisgau, Fed. Rep. of Germany

[21] Appl. No.: 757,280

[22] Filed: Jul. 19, 1985

[30] Foreign Application Priority Data

Jul. 20, 1984 [DE] Fed. Rep. of Germany ....... 3426867

[51] Int. Cl.$^4$ .......................... G01C 19/64; G01B 9/02
[52] U.S. Cl. .................................................. 356/350
[58] Field of Search ......................................... 356/350

[56] References Cited

U.S. PATENT DOCUMENTS

| | | | |
|---|---|---|---|
| 4,429,573 | 2/1984 | Walker | 356/350 |
| 4,514,088 | 4/1985 | Coccoli | 356/350 |
| 4,573,795 | 3/1986 | Auch et al. | 356/350 |

FOREIGN PATENT DOCUMENTS

| | | | |
|---|---|---|---|
| 2949327 | 1/1980 | Fed. Rep. of Germany | 356/350 |
| 3136688 | 9/1981 | Fed. Rep. of Germany | 356/350 |

Primary Examiner—Vincent P. McGraw
Assistant Examiner—S. A. Turner
Attorney, Agent, or Firm—Elliott N. Kramsky

[57] ABSTRACT

Method and apparatus for angular rate measurement and digital angular rate readout by means of a fiber interferometer using the Sagnac effect. Three component light beams are generated by means of an acousto-optical modulator which is operated in the Raman-Nath region. One component light beam is introduced unmodulated in a first direction into a fiber coil while the second and third component light beams are introduced with raised and lowered frequencies, respectively in the opposite direction. After passing through the coil, the component light beams are received by a photodetector and fed to controllers for generating the differential frequencies. Weighted, the differential frequencies are subtracted from each other or summed and evaluated as the angular rate and/or measures of the temperature of the fiber coil.

18 Claims, 4 Drawing Figures

METHOD AND APPARATUS FOR MEASURING RATE OF ROTATION BY THE SAGNAC EFFECT

BACKGROUND

1. Field of the Invention

The present invention relates to methods and apparatus for measuring angular rates. More particularly, this invention pertains to a new method and apparatus for measuring rotation based upon the Sagnac phase shift of beams upon counterrotation within a fiber optic coil.

2. Description of the Prior Art

In a fiber interferometer gyroscope operating in accordance with the Sagnac effect, the phase difference, over one rotation, of two component counterrotating light fluxes, may be compensated by modulating or controlling the frequency difference between the component light fluxes. The phase shift occasioned by a single rotation is thus compensated by a regulated frequency shift. The possibility of such phase compensation has long been known in principle. See for example, R. F. Cahill and E. Udd, "Phase-nulling Fibre Optic Laser Gyros", *Opt. Lett.* Vol. 4, No. 3 (1979). Unfortunately, proper frequency shifting cannot presently be carried out in the desirable very low frequency range as conventional single-sideband modulators (Bragg cells) are only available above about 20 MHz. The large Sagnac phase difference resulting from such a large frequency shift permits only high-order compensation if one single-sideband modulator is employed. Since phase difference is proportional to the optical length of the fiber, an unacceptably large amount of temperature-dependent null drift results. One solution to this problem is disclosed in Federal Republic of Germany patent publication (Offenlegungsschrift) Ser. No. 29 34 794. Two single sideband modulators are utilized therein. As a result, the actual frequency differential between the counterrotating beams in the fiber coil remains much lower than the frequency of a single modulator. In comparison with an interferomoter utilizing a single modulator, measuring accuracy and stability can be improved at most by a factor of about 33. This result is disclosed in detail in Ser. No. 29 34 794.

It would be highly desirable to further increase measurement of angular rates by a fiber interferometer gyroscope. It would be additionally advantageous to increase accuracy while simplifying the construction of the measuring and read-out arrangement, and, further, to minimize the effects of temperature-dependent changes of the null drift, the scale factor and other parameters of the interferometer.

SUMMARY OF THE INVENTION

The present invention overcomes the foregoing and additional shortcomings of the prior art by providing, in a first aspect, a method for measuring rotation by the Sagnac effect. This method includes the step of providing a beam of coherent light. The beam is then divided into first, second and third component beams, the first of which is then coupled in a first direction into a fiber optic coil. The second and third component beams are coupled into the fiber optic coil in a second direction whereby the first component beam counterrotates with the second and third component beams. The counterrotating beams are then recombined after one cycle of the coil and the recombined beams directed to a photodetector. The phase shifts of the recombined beams are determined and the frequency of the second beam is increased and the frequency of the third beam is decreased by amounts such that the phase shifts are fixed modulo $2\pi$ phase differences. The frequency differentials between the first and second and the first and third component beams are then measured and then the angular rate is calculated as a weighted function of these frequency differentials.

In a second aspect, the invention is directed to apparatus for measuring rotation by the Sagnac effect. This apparatus includes means for generating a beam of coherent light. Means are provided for dividing the beam into a first, a second and a third component beam. A fiber optic coil and means for coupling the first component beam into the coil in a first direction are further provided. Means are additionally provided for coupling the second and third component beams into the coil in the opposite direction and for recombining the counterrotating beams and for detecting the phase shifts of the recombined beams.

A first modulator is responsive to the phase shift to increase the frequency of the second component beam until such Sagnac phase shift is a fixed modulo $2\pi$ phase difference. Means are provided for measuring the amount of such increase in frequency. A second modulator is responsive to the phase shift for decreasing the frequency of the third component beam until the Sagnac phase shift is a fixed modulo $2\pi$ difference and means are provided for measuring this decrease in frequency. Finally, means are provided for determining the angular rate, scale factor and temperature as a function of such measured increase and decrease in frequency.

The preceding and other features and advantages of the invention will become further apparent from the detailed description that follows. The written description is accompanied by a set of drawing figures in which numerals point out the various features of the invention, like features of the written description and drawing figures referring to like features of the invention throughout.

DETAILED DESCRIPTION

Figure 1:
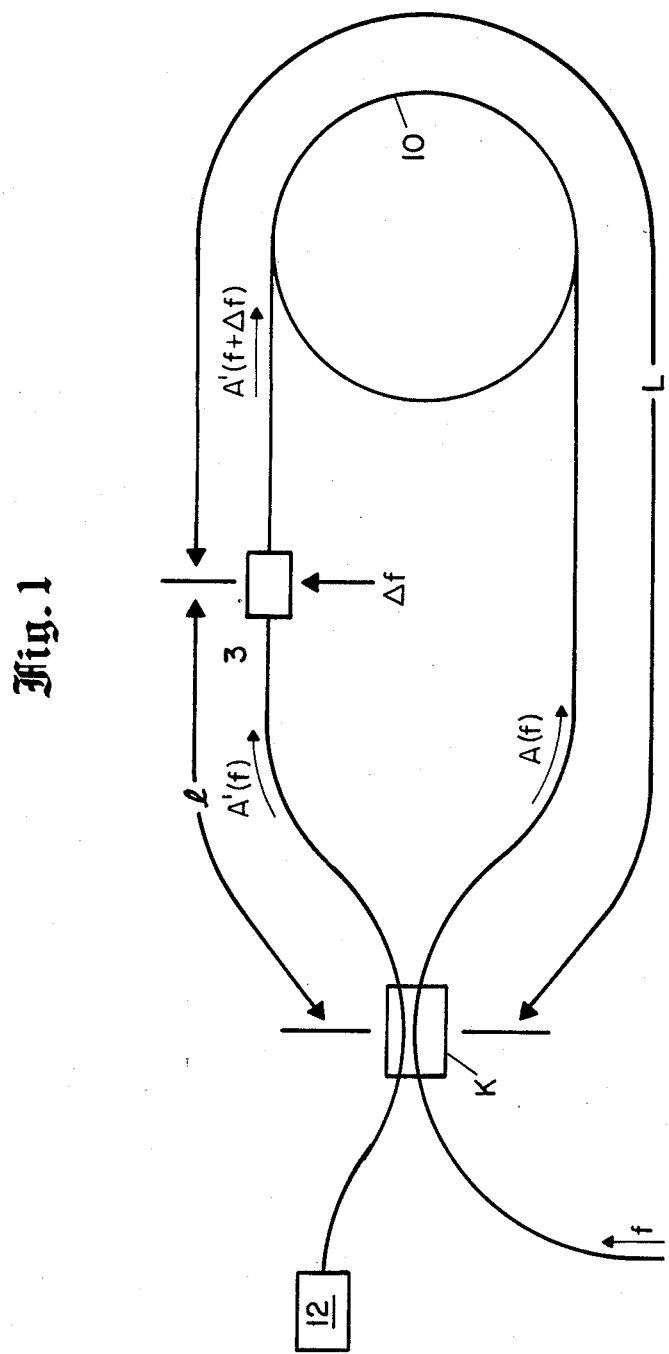
FIG. 1 is an optical diagram for use in illustrating the principles and mode of operation of the invention.

Turning now to the drawings, FIG. 1 is an optical diagram for illustrating the principle of operation of the Sagnac fiber interferometer gyroscope. As shown, a light flux of frequency f, emitted by a coherent light source (not shown) is divided into component light fluxes A and A' at a coupler K. Component light flux A is introduced unchanged into a light-conducting fiber coil 10 in a first direction. The frequency of the component light flux A' is shifted by $\Delta f$ by means of a modulator 3. Thereafter, this component light flux is introduced into the fiber coil 10 in the opposite direction. After passing through the coil, the two component light fluxes are recombined in the coupler K and directed to a photodetector 12.

Using the paths specified in FIG. 1, the phase difference $\Delta\Phi$ at coupler K, after passing through the fiber coil 10, is as follows:

$$\Delta\Phi = \frac{2\pi n (L - l)}{c} \Delta f + \Phi_s \quad (1)$$

where $\Phi_s$, the Sagnac phase, is defined as:

$$\Phi_s = \frac{4\pi \cdot R \cdot L}{\lambda_o \cdot c} \Omega \quad (2)$$

(R: coil radius, L: fiber length, l: fiber length between coupler K and modulator 3, $\lambda_o$: optical wavelength, c: velocity of light, $\Omega$: rate of rotation, n: refractive index).

If now the frequency of flux A' is increased and $\Delta f^+$ is regulated so that the Sagnac phase $\Phi_s$ is compensated in the $m^{th}$ order, the following applies:

$$\Delta\Phi_m = 2\pi m = \frac{2\pi n (L - l)}{c} \Delta f^+ + \Phi_s \quad (3)$$

According to the invention, a third component light flux is generated and decreased (shifted down) in frequency by $\Delta f^-$. A control loop regulates the value of $\Delta f^-$ so that the Sagnac phase difference is compensated in the $-k^{th}$ order with the sign reveral of $\Delta f$. Thus, according to equation (3), the following applies:

$$\Delta\Phi_{-k} = 2\pi k = \frac{-2\pi n (L - l)}{c} \Delta f^- + \Phi_s \quad (4)$$

By taking measurements in rapid succession (e.g. at 200 Hz), the rate of rotation may be assumed to be constant. Further assuming a non-zero angular rate, the addition of equations (3) and (4) produces:

$$2\Phi_s = \frac{2\pi n (L - l)}{c} (\Delta f^- - \Delta f^+) + \text{mod}(2\pi) \quad (5)$$

The difference between these equations is:

$$2\pi(m + k) = \frac{2\pi n (L - l)}{c} (\Delta f^+ + \Delta f^-) \quad (6)$$

Combining equations (5) and (6) results in the following expression for the Sagnac phase:

$$\Phi_s = \frac{(\Delta f^- - \Delta f^+)}{(\Delta f^+ + \Delta f^-)} 2\pi(m + k) + \text{mod}(2\pi) \quad (7)$$

Equations (6) and (7) allow one to determine both Sagnac phase shift and optical fiber length (and thus temperature and scale factor) from the frequency signals $\Delta f^+$ and $\Delta f^-$. The angular rate, independent of null-drift effects, is then derived from equation (2).

Figure 2:
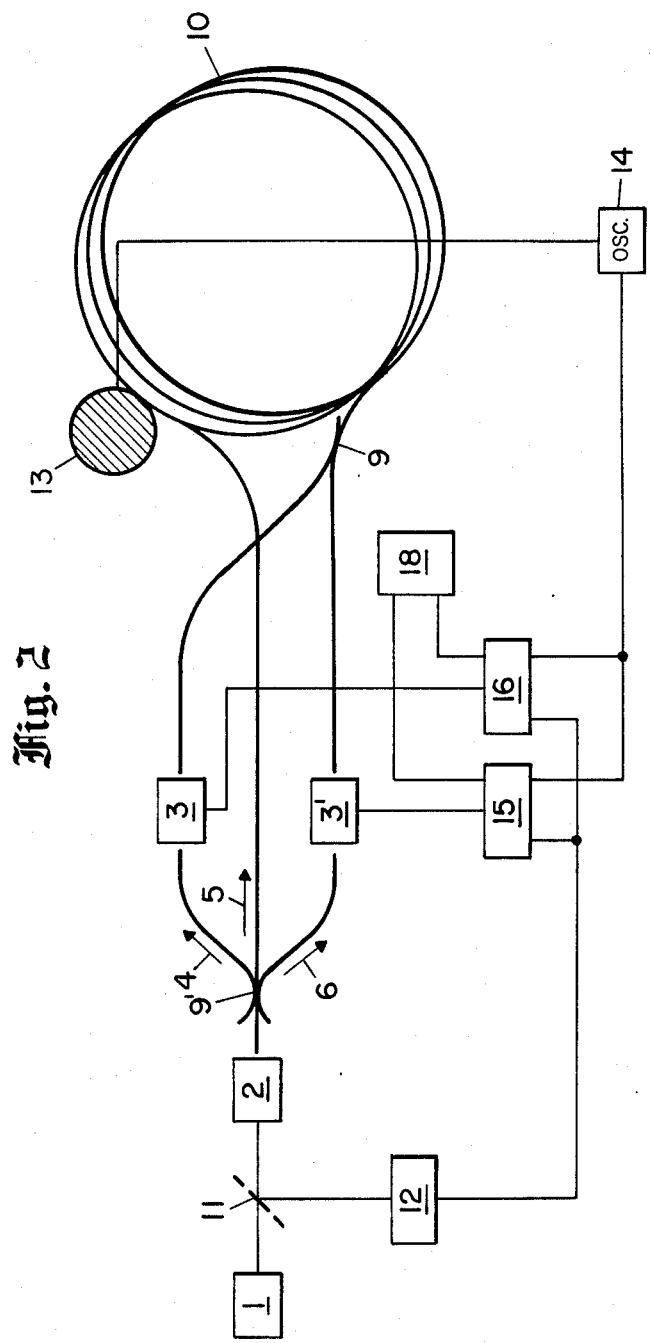
FIG. 2 is a schematic diagram of a fiber interferometer gyroscope in accordance with a first embodiment of the invention.

FIG. 2 is a schematic diagram of a fiber interferometer gyroscope arranged in accordance with the invention. Light from a monochromatic light source 1 passes through a polariser 2 and is divided into light beams 4, 5 and 6 at the coupler 9'. The light beam 5 is coupled, unchanged in frequency, into the fiber coil 10. The component light beams 4 and 6 are frequency-shifted by $\Delta f^+$ and $\Delta f^{31}$ respectively by means of acousto-optical modulators 3 and 3' such as Bragg cells or the like. The beams 4 and 6 are alternately coupled, in a direction opposite to the light beam 5, into the fiber coil 10 by means of a coupler 9. The alternating coupling-in of the light beams 4 and 6 is achieved by means of electronic control loops 15 and 16. In each instance, the switching frequency is sufficiently high so that temperature changes may be neglected. On the other hand, this frequency is not so high that problems will be incurred with regard to the control loops; appropriate switching frequencies lie within the range of about 10 to a few hundred Hz. In practice, switching frequencies within the range of from 100 to 200 Hz have been employed.

The two counterrotating light beams are recombined in the coupler 9' and reach the photodetector 12 via the polariser 2 and the beam splitter 11. The signal of the photodetector 12 is used by the control loops 15 and 16 to drive the acousto-optical modulators 3' and 3 in such a manner that the signal is regulated to become zero at the photodetector 12. A signal generator 18 controls the electronic control loops 15 and 16 so that the light beams 4 and 6 are alternately coupled into the fiber coil 10. The fiber coil 10 is modulated by means of a known phase modulator 13 that is driven by an oscillator 14.

Figure 3:
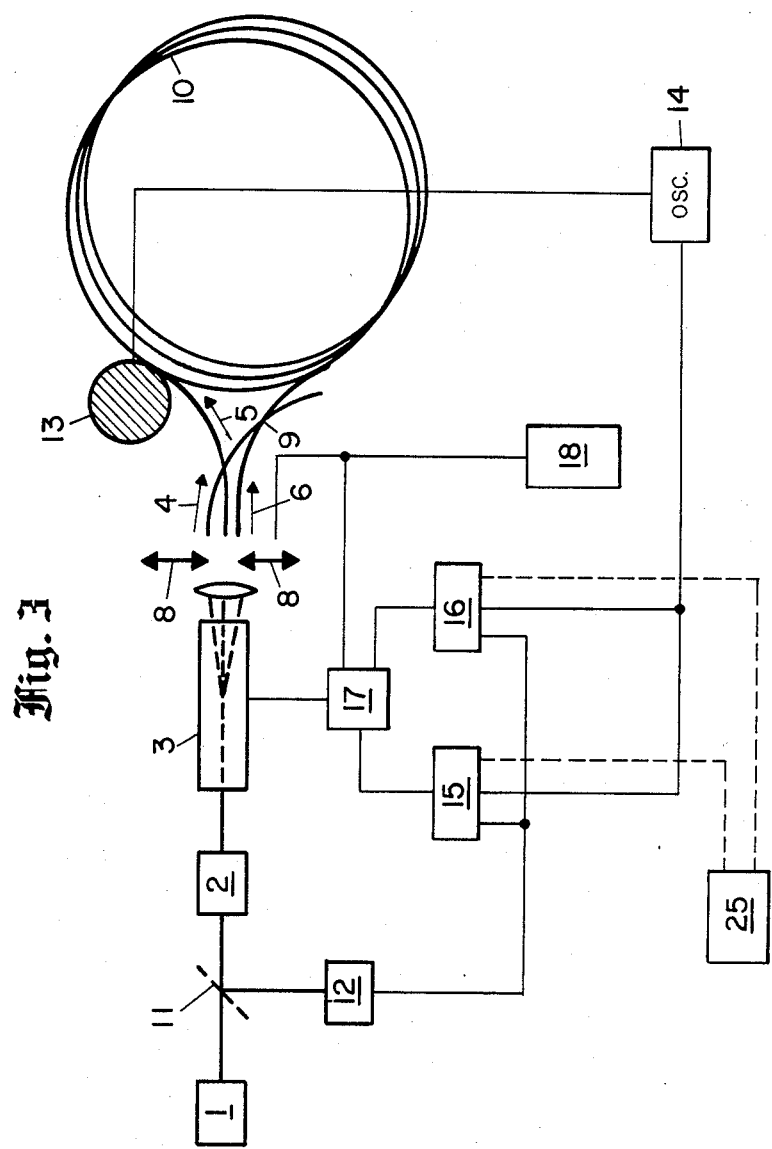
FIG. 3 is a schematic diagram of the invention in accordance with a second embodiment utilizing a single acousto-optical coupler.

FIG. 3 is a schematic diagram of the invention in accordance with an alternative embodiment. The light beam emergent from the monochromatic light source 1 passes through a polariser 2 into an acousto-optical modulator 3, such as a Bragg cell, that is operated in the Raman-Nath region. At the output of the modulator 3, the light beams 4, 5 and 6 appear, light beam 4, its frequency increased by $\Delta f^+$, light beam 5 (unchanged in frequency) and light beam 6, its frequency decreased by $\Delta f^-$. The light beam 5 of unchanged frequency is coupled in a first direction into the corresponding open fiber end of the fiber coil 10 while light beams 4 and 6, of increased and decreased frequency respectively, are alternatively coupled in the opposite direction, into the fiber coil 10. The alternating switching is accomplished by means of an optical switch or slider 8 that is actuated by electromagnetic or piezoelectric means. An example of such a piezoelectric means would be a diaphragm arrangement mounted on a piezoelectric double-layer element (bimorph). The frequency of the switch 8 is determined as discussed supra. The component light beams 4 and 6 can be blocked by means of the optical switch so that only one of these light beams enters the fiber coil 10 at a time via a coupler 9. The returning (formerly counterrotating) light beams are combined in the modulator 3. The light subsequently passes through a polariser 2 and is radiated into a photodetector 12 via a beam splitter 11.

The fiber coil 10 is modulated by a phase modulator 13 that is driven by a oscillator 14. The corresponding frequency component derived from the signal of the photodetector 12 is nulled by means of electronic control loops 15 and 16 that are responsible for the component light beams 4 and 6, respectively. A signal generator 18 controls both the optical switch 8 and the switching of the modulated high frequency for the acousto-optical modulator 3 by means of a change-over switch 17.

Figure 4:
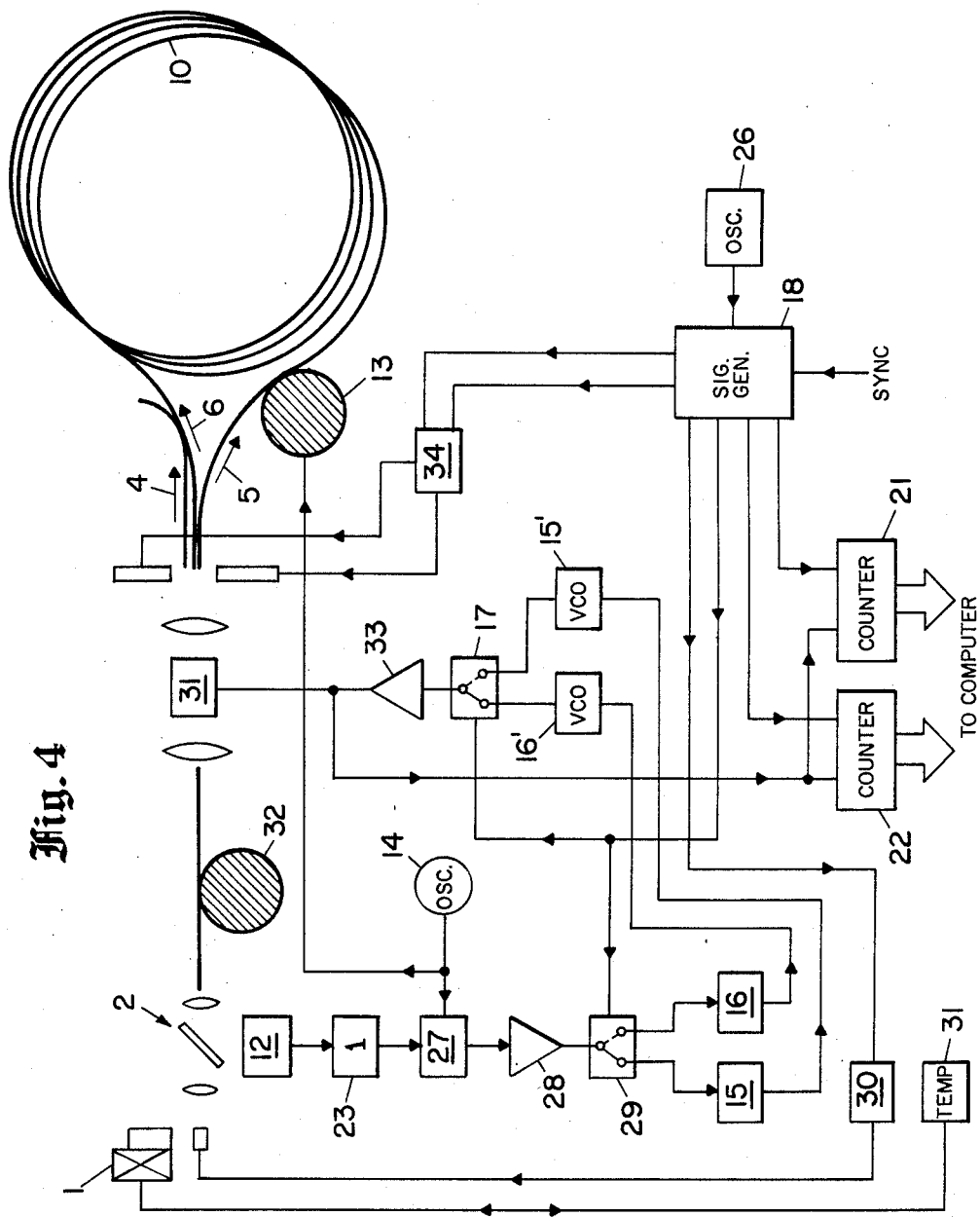
FIG. 4 is a more detailed diagram of the invention, in accordance with a tested embodiment.

FIG. 4 is a detailed schematic view of a Sagnac interferometer comprising an acousto-optical modulator. Coherent light of a light source 1 that is temperature-stabilized by a device 31 reaches an acousto-optical modulator 3 operating in the Raman-Nath region via a polariser 2. The modulator divides the beam into three component beams, of which the unmodulated light beam 5 is directed in a first peripheral direction about a fiber coil 10. Modulated light beams 4 and 6 are alternately directed in the opposite peripheral direction about the coil 10 by means of the optical switch 8. The light beams are then recombined in the acousto-optical modulator 3 and directed to the photodiode 12 by the polariser 2. The output of the ring is modulated by means of the oscillator 14 and the phase modulator 13. The output of the photodiode 12 reaches the controllers 15 and 16 through band filter 23, mixer 27, amplifier 28 and switch 29. The controllers regulate the output frequency of the VCO's (voltage-controlled oscillators) 15' and 16', the outputs of which, in turn, drive the acousto-optical modulator 3 via switch 17 and amplifier 33 in such a manner that the signal at the photodiode 12 disappears.

The output of the amplifier 33 is evaluated by a computer 25 via the counters 22 and 21 as information relating to temperature and angular rate. A synchronized signal transmitter 18, driven by a reference oscillator 26, controls the optical switch 8 and the switches 17 and 29 via the switch 34 and delivers gating pulses to the counters 21 and 22. During the switching time, the laser diode 1 is switched off by supply section 30.

A prerequisite for the method according to the invention is a sufficiently coherent light source so that an inteference in the $m_{th}$ or $k_{th}$ order can be seen. Single-mode semiconductor lasers are well suited for this purpose.

According to another possible embodiment of the fiber optic interferometer according to the invention, the beams 4 and 6 can be continuously coupled in so that no optical switches or diaphragms are needed. For this purpose, one phase modulator each is arranged in the component light beams 4 and 6, the modulation frequencies of which differ. Control electronics, equipped with corresponding filters, are then able to differentiate between the component beams 4 and 6 and to separate the signals again.

Thus it is seen that there has been brought to the inertial navigation art a new method and apparatus for measuring angular rates. By employing the teachings of the invention, one is able to attain a digital rate signal, independent of temperature and refractive index, that is characterized by a very large dynamic range. Further, disturbing lower frequency interferences are avoided as the frequency of the Rayleigh-scattered light of the optical fiber is offset at least $\Delta f$ from the useful signal, thus simplifying the configuration of the signal measuring apparatus.

While this invention has been disclosed with reference to its presently preferred embodiments, it is by no means limited thereto. Rather, the scope of this invention is limited only insofar as defined in the following set of claims and all equivalents thereof.

What is claimed is:

1. A method for measuring rotation by the Sagnac effect with an interferometer comprising the steps of:
   (a) providing a beam of coherent light; then
   (b) dividing said beam into first, second and third component beams; then
   (c) coupling said first component beam in a first direction into a fiber optic coil; and
   (d) coupling said second and third component beams in a second direction through said fiber optic coil whereby said first component beam simultaneously counterrotates with said second and third component beams; and
   (e) recombining said first and second counterrotating beams to form a first recombined beam and said first and third counterrotating beams to form a second recombined beam after one cycle of the coil; then
   (f) directing said recombined beams to a photodetector; then
   (g) measuring the phase shifts of said recombined beam pairs; then
   (h) increasing the frequency of said second component beam and decreasing the frequency of said third component beam so that said phase shifts of said first and second recombined beams are each fixed modulo $2\pi$ differences; and
   (i) measuring a first frequency differential between said first and second component beams and a second frequency differential between said first and third component beams; then
   (j) calculating the Sagnac phase shift and the optical length of the coil from said first and second frequency differentials; and then
   (k) calculating the rate of rotation from said Sagnac phase shift and said optical length.

2. A method as defined in claim 1 further characterized in that the optical length of the fiber coil and the scale factor of the angular rate measurement and of temperature are determined as a weighted sum of said first and second frequency differentials.

3. Apparatus for measuring rotation by the Sagnac effect comprising, in combination:
   (a) means for generating a beam of coherent light;
   (b) means for dividing said beam into a first, a second and a third component beam;
   (c) a fiber optic coil;
   (d) means for coupling said first component beam into said coil in a first direction;
   (e) means for simultaneously coupling said second and third component beams into said coil in the opposite direction;
   (f) means for recombining said first and second counterrotating beams and said first and third counterrotating beams to form first and second recombined beams;
   (g) means for detecting the phase shifts of said recombined beams;
   (h) a first modulator responsive to said Sagnac phase shift for increasing the frequency of said second component beam by such amount that the phase shift of said first recombined beam is a fixed modulo $2\pi$ phase difference;
   (i) means for measuring the amount of said increase in frtequency;
   (j) a second modulator responsive to said Sagnac phase shift for decreasing the frequency of said third component beam by such amount that the phase shift of said second recombined beam is a fixed modulo $2\pi$ phase difference;
   (k) means for measuring the amount of said decrease in frequency;
   (l) means for determining the angular rate, scale factor and temperature as functions of said amount of increase and said amount of decrease in frequency.

4. Apparatus as defined in claim 3 wherein each of said first and second modulators further comprises:
   (a) an electronic regulating circuit, said circuit being responsive to the phase shift of a recombined beam and for producing a signal related thereto; and
   (b) a phase shifter responsive to said signal.

5. Apparatus as defined in claim 3 wherein said fiber optic coil is fabricated of monomode fiber.

6. Apparatus as defined in claim 5 wherein said fiber optic coil is fabricated of strongly birefringent, polarization-maintaining monomode fiber.

7. Apparatus as defined in claim 5 wherein said fiber optic coil is fabricated of polarizing monomode fiber.

8. Apparatus as defined in claim 3 further characterized in that said modulators and said means for coupling are fabricated in integrated optics.

9. Apparatus as defined in claim 3 further characterized in that said modulators comprise a pair of Bragg cells.

10. Apparatus as defined in claim 3 further characterized in that said modulators comprise an acousto-optical modulator comprising two acoustic exciters.

11. Apparatus as defined in claim 3 further characterized in that said modulators comprise a single Bragg cell having a plurality of frequency arrangements associated therewith.

12. Apparatus as defined in claim 3 wherein said means for dividing and said modulators comprise an acousto-optical modulator operating in the Raman-Nath region.

13. Apparatus as defined in claim 3 further characterized in that said means for coupling said second and third component beams into said coil further includes means for alternately coupling said beams.

14. Apparatus as defined in claim 13 wherein said means for alternately coupling said second and third component beams further includes means for applying a control signal at a preselected switching frequency to said modulators.

15. Apparatus as defined in claim 13 wherein said means for alternately coupling said second and third component beams further includes:
 (a) a plurality of diaphragms; and
 (b) means for controlling said diaphragms.

16. Apparatus as defined in claim 15 further characterized in that said means for controlling said diaphragms comprises electromagnetic apparatus.

17. Apparatus as defined in claim 15 further characterized in that said means for controlling said diaphragms comprises piezoelectric apparatus.

18. Apparatus as defined in claim 3 further including means for filtering said recombined beams.

* * * * *